United States Patent [19]

Silvestri

[11] 4,280,529

[45] Jul. 28, 1981

[54] VENTED FUEL TANK CAP

[76] Inventor: Giancarlo Silvestri, Via Mazzini 82/6, 40138 Bologna, Italy

[21] Appl. No.: 16,500

[22] Filed: Mar. 1, 1979

[51] Int. Cl.³ ............................................ F16K 17/196
[52] U.S. Cl. ................... 137/493.3; 220/204; 220/210
[58] Field of Search ................... 137/493.3, 493.6; 220/203, 204, 210

[56] References Cited

U.S. PATENT DOCUMENTS

| | | | |
|---|---|---|---|
| 1,933,454 | 10/1933 | Sidney | 137/493.3 |
| 2,133,200 | 10/1938 | Kenneweg | 137/493.3 |
| 2,164,450 | 7/1939 | Eshbaugh | 220/203 |
| 3,153,423 | 10/1964 | Biello | 137/493.6 X |
| 3,477,458 | 11/1969 | Maddalozzo | 137/493.3 X |
| 3,896,845 | 7/1975 | Parker | 137/493.3 |
| 4,000,828 | 1/1977 | Crute | 220/203 |

FOREIGN PATENT DOCUMENTS

| | | | |
|---|---|---|---|
| 1021902 | 2/1953 | France | 137/493.6 |
| 2266079 | 3/1974 | France | 137/493.3 |
| 606577 | 7/1960 | Italy | 137/493.6 |
| 1285733 | 8/1972 | United Kingdom | 137/493.6 |

Primary Examiner—Robert G. Nilson

[57] ABSTRACT

A fuel tank cap for a motor vehicle includes a venting passage normally closed by a spring-biased valve adapted to vent the tank where the pressure in the tank exceeds the atmospheric pressure by more than a first given differential. The valve body is bored to receive a spring-biased ball valve acting in the opposite direction to allow the atmosphere to the tank when the atmospheric pressure exceeds the pressure in the tank by more than a second given differential.

2 Claims, 3 Drawing Figures

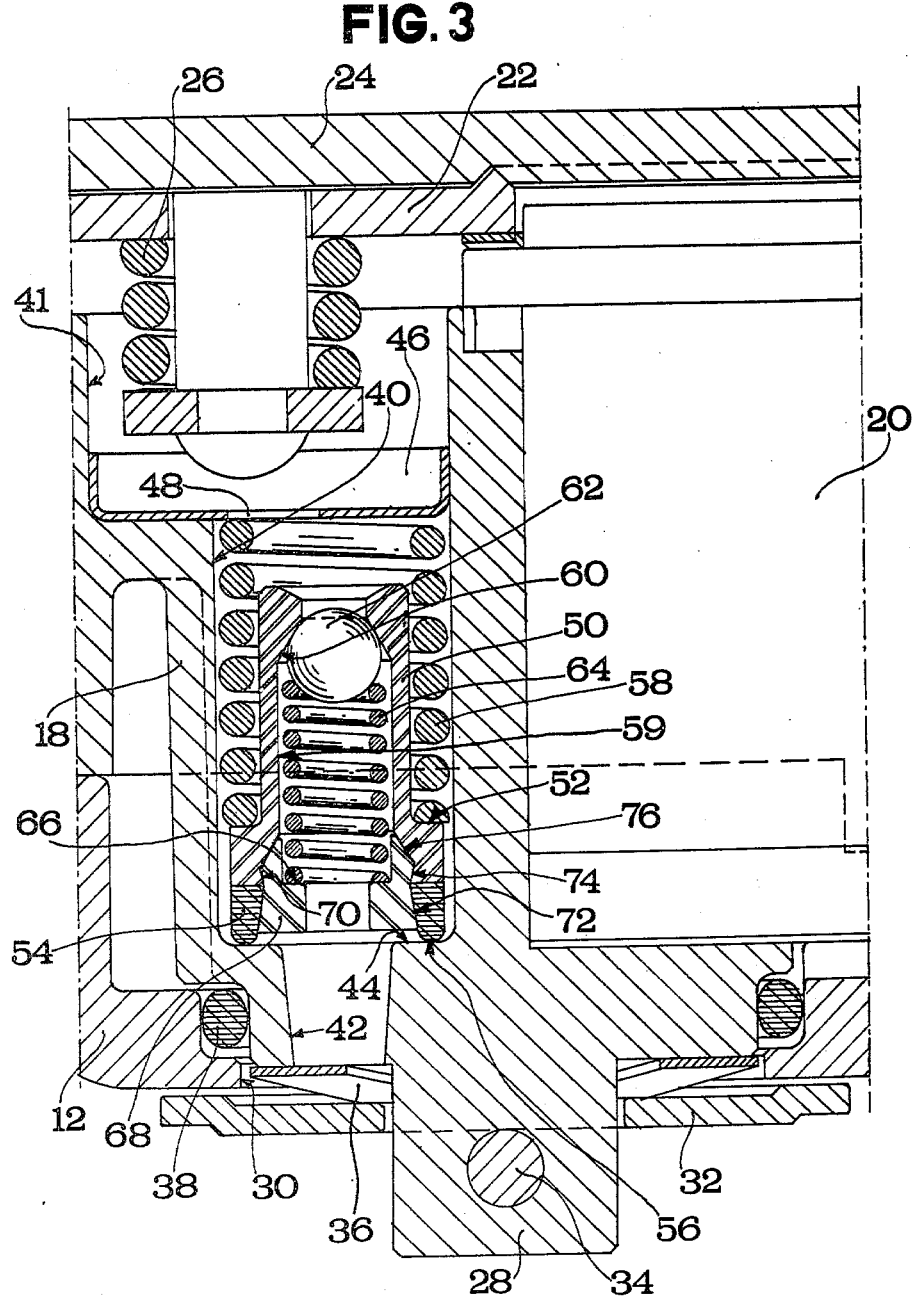

VENTED FUEL TANK CAP

This invention relates to a vented cap for the fuel tank of motor vehicles.

For venting fuel tanks it is known to use opposed double valves which normally keep the fuel tank closed relative to the atmosphere, but permit ambient air to enter the fuel tank to compensate for the low pressure which may be caused in the fuel tank due to fuel being sucked in by the fuel pump. These valves also normally prevent fuel vapour from escaping from the fuel tank to atmosphere, but permit them to be vented when the pressure of the vapour within the fuel tank becomes excessive or dangerous. Often such double valves are mounted directly on the fuel tank, but it is also common to incorporate them in the closure cap of the fuel tank. In the latter case, however, the considerable dimensions of the double valve have made it practically impossible or inconvenient to install the valve in closure caps provided with a lock as it has been difficult to accommodate both the lock and the valve within the limited space available.

It is therefore an object of the present invention to provide a fuel tank cap having a vent valve designed and installed within the cap so as to leave sufficient space for a lock. A further object of the present invention is to provide such a fuel tank cap having a vent valve at low cost and by simple means without complicating the assembly of the cap.

According to the present invention a vented fuel tank cap for a motor vehicle comprises a body having a venting passage therethrough which is stepped to form a first abutment surface between a first portion of the passage and a second portion of the passage of enlarged cross-section, the said first portion being positioned upstream of the said second portion when fuel vapour is vented to atmosphere through the passage in use of the fuel tank cap, the said second portion having a restricted opening at its end remote from the said first portion to form a second abutment surface, and a valve body having an annular sealing surface engaging said first abutment surface under the action of a first helical spring extending coaxially of the valve body and acting between said second abutment surface and an annular third abutment surface on the valve body, the valve body having a substantially cylindrical axial bore restricted, at the end remote from said sealing surface, by a ball loosely accommodated in said bore, and a second helical spring acting between the ball and an annular fourth abutment surface on the valve body at the end thereof adjacent said sealing surface.

The invention will now be described by way of example with reference to the accompanying drawings, in which:

FIG. 3 is an axial section, on an enlarged scale, showing a portion of fuel tank cap of FIGS. 1 and 2.

Figure 1:
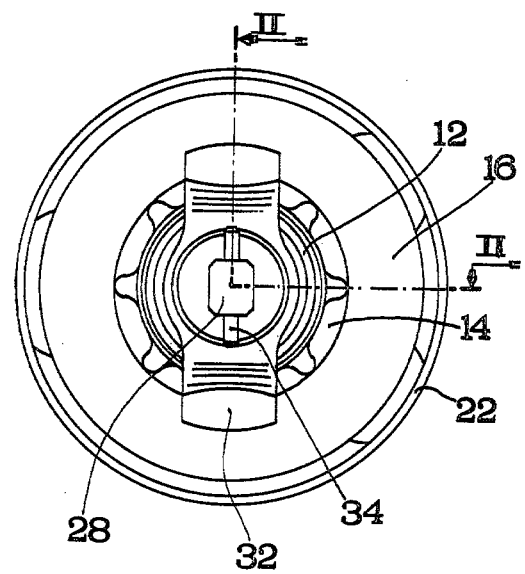
FIG. 1 is a bottom plan of a fuel tank cap according to the invention.
Figure 2:
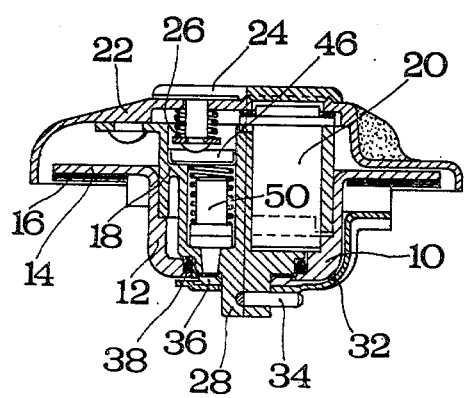
FIG. 2 is an axial section taken on the lines II—II of FIG. 1.

As best shown in FIG. 2, in the preferred embodiment of the invention the fuel tank cap comprises an inner portion 10 formed by a cup 12 having a circular rim 14 provided with a gasket 16, for example adhered thereto, a body 18 accommodating a lock cylinder 20, and an outer cover 22 riveted to the body 18. The lock 20 permits the body 18 to be locked to and unlocked from the inner portion 10 of the cap to allow rotation of the latter by turning the cover 22 and thus permit the cap to be locked to or unlocked from the filler neck (not shown) of the fuel tank. The cover 22 is provided with an opening for access to the lock, this opening being covered by a keyhole cover plate 24 secured to the cap by spring means 26. The central body 18 of the cap is further provided with an extension 28 of non-circular shape, which projects through a hole 30 in the bottom of the cup 12. A bayonet spring 32 is secured to the extension 28 by a pin 34 with the interposition of a spring washer 36 in the conventional manner to permit the cap to be connected to the filler neck (not shown), likewise in the conventional manner. An O-ring 38 provides for sealing between the hole 30 of the cup 12 and the central body 18. The pin 34 keeps the entire cap in the assembled condition.

As shown particularly in FIG. 2, the lock 20 is arranged eccentrically relative to the axis of the central body 18 which is provided with an eccentric bore or venting passage comprising a first portion 42 which communicates with, and tapers inwardly towards, the inside of the fuel tank (not shown) and which terminates adjacent the extension 28, and a circular cylindrical second portion 40 of enlarged diameter which communicates with the outside or atmosphere through the gaps between the keyhole cover plate 24 and the cover 22 and with the inside of the fuel tank through a hole 42 of reduced diameter which opens adjacent the extension 28. The difference in diameter between the circular cylindrical valve seat 40 and the hole 42 provides an annular abutment surface 44. The upper end (as seen in FIG. 3) of the second portion 40 opens into a chamber 41 of enlarged cross-section which is separated from the second portion 40 by a cup-shaped cover 46 made, for example, of deep-drawn sheet metal and inserted by force fit in the chamber 41, this cover 46 being provided with a through opening 48.

The second portion 40 of the vented passage accommodates a double vent valve. The vent valve includes a valve body 50 comprising a first annular member the peripheral wall of which is formed by two coaxial cylindrical portions of different diameters so as to form an abutment surface 52 intermediate the ends of the body 50, a second annular member at the end of the valve body positioned nearer the inside of the cap, and in the form of an annular gasket 54 made of elastomeric material such as rubber and having a rounded rim 56 forming a sealing surface engaging the abutment surface 44, and a third annular member or insert 68. A helical spring 58 is inserted between the cover 46 and the abutment surface 52 of the valve body 50 to bias the valve body towards, and the sealing surface 56 of the gasket 54 against, the abutment surface 44.

The valve body 50 is hollow and its said first annular member has a central through opening 59 which is upwardly restricted by a tapering portion 60 against which a ball 62 accommodated in the opening 59 is biased by a weak helical spring 64. The end of the spring 64 remote from the ball 62 engages an abutment surface 66 on the insert 68 which is firmly secured to the said first annular member of the valve body 50. In the illustrated preferred embodiment the central through opening 59 widens towards the first portion 42 of the vented passage and then narrows slightly to form a frustoconical portion 70. The peripheral outer surface of the insert 68 is defined by a lowermost (as seen in FIG. 3) or first frustoconical portion 72 which tapers upwardly and, together with the lower edge of the said first annular member of the valve body 50, defines a seat for the annular gasket 54, an intermediate or second frustoconical portion 74 which tapers downwardly and is of a length and taper complementary to those of the portion 70 of the valve body 50, and an uppermost or third frustoconical portion 76 which tapers upwardly.

When the insert 68 is inserted in the central through opening 59, the portion 74 of the insert 68 will exert a pressure on the portion 70 of the valve body 50 and due to the resilience of the material of which these two portions of the valve are made, the surfaces 74 and 70 will be deformed and these two portions will be connected by spring action. Once these two portions are connected they will remain in the assembled condition due to the pressure exerted between the opposed frustoconical surfaces of the portions 70 and 74. The force of the spring 64 is so selected that it cannot separate these two portions.

It will thus be apparent that, with the described construction of the valve, the ball 62 will be withdrawn against the action of the spring 64 whenever the pressure within the fuel tank becomes excessively low, so that the ambient air may enter the fuel tank to re-establish the balance of pressure therein. On the other hand, an excess of pressure within the fuel tank, which may be caused by the development of fuel vapours under the influence of heat, will lead to compression of the helical spring 58 and removal of the sealing surface 56 from the abutment surface 44 so that the overpressure will be released. The elasticity constant of the spring 58 is selected to be higher than that of the spring 64 so that the spring 58 will only be compressed by a considerable overpressure in the fuel tank.

It will thus be evident that the present invention provides a vented fuel tank cap of very reduced dimensions at low cost and with the advantage of easy assembly of its parts.

Although in the preferred embodiment described herein the fuel tank cap is provided with a lock because the described construction is particularly suitable for the incorporation of a lock, due to its reduced dimensions, it will be evident that such a fuel tank cap can also be made without a lock.

It will also be evident to those skilled in the art that numerous minor changes and modifications may be made in the described preferred embodiment without departing from the scope of the invention as defined by the appended claims. In particular, the parts 50 and 68 could be assembled by adhesively connecting them and in this case they could have a configuration different from that shown and illustrated.

I claim:

1. A vented fuel tank cap for a motor vehicle, comprising a body occupying only part of the cross-sectional area of the cap and having a venting passage therethrough which is stepped to form a first abutment surface between a first portion of the passage and a second portion of the passage of enlarged cross-section, said first portion being positioned upstream of said second portion when fuel vapour is vented to atmosphere through the passage in use of the fuel tank cap, said second portion having a restricted opening at its end remoted from said first portion to form a second abutment surface, and a valve body having an annular sealing surface engaging said first abutment surface under the action of a first relatively strong helical spring extending co-axially of the valve body and extending between said second abutment surface and an annular third abutment on the valve body to resist pressure exerted from inside the fuel tank, the valve body having a substantially cylindrical axial bore restricted, at the end remote from said sealing surface, by a ball loosely accommodated in said bore, and a second helical spring weaker than said first helical spring and acting between the ball and an annular fourth abutment surface on the valve body at the end thereof adjacent said sealing surface to resist atmospheric pressure exerted by ambient air on said tank cap, the peripheral wall of said valve body being formed by two coaxial cylindrical portions of different diameters which produce said third abutment surface, of annular form, where they meet, said sealing surface being arranged at the end of the portion having the larger diameter and being formed of a rounded surface of an annular gasket of elastomeric material of non-circular cross-section, the end of the valve body adjacent said sealing surface having an enlarged opening which opens into said axial bore and into which is inserted an insert having a central opening defining in part the axial bore of the valve body, the said central opening being stepped to form said fourth abutment surface, a portion of the insert having a peripheral outer surface complementary to the inner surface of the said enlarged opening but of slightly greater diameter, the insert and/or the part of the valve body into which the insert is inserted, being made of resilient material so that the insert can be inserted into the said enlarged opening by spring action.

2. A vented fuel tank cap as claimed in claim 1, in which a portion of the outer peripheral surface of the insert is flared to provide a retaining seat for said sealing gasket.

* * * * *